(12) United States Patent  
Filter et al.

(10) Patent No.: US 12,172,485 B2  
(45) Date of Patent: Dec. 24, 2024

(54) AIR SUSPENSION SYSTEM FOR A VEHICLE

(71) Applicant: ZF CV Systems Europe BV, Brussels (BE)

(72) Inventors: Stefan Filter, Hannover (DE); Johann Lucas, Sehnde (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/717,894

(22) Filed: Apr. 11, 2022

(65) Prior Publication Data

US 2022/0234411 A1 Jul. 28, 2022

Related U.S. Application Data

(63) Continuation of application No. PCT/EP2020/077912, filed on Oct. 6, 2020.

(30) Foreign Application Priority Data

Oct. 28, 2019 (DE) ...................... 10 2019 129 014.7

(51) Int. Cl.  
*B60G 17/052* (2006.01)

(52) U.S. Cl.  
CPC ...... *B60G 17/0523* (2013.01); *B60G 2300/04* (2013.01); *B60G 2400/252* (2013.01); *B60G 2400/51222* (2013.01)

(58) Field of Classification Search  
CPC ............ B60G 17/0523; B60G 2300/04; B60G 2400/252; B60G 2400/51222; B60G 17/0155  
See application file for complete search history.

(56) References Cited

U.S. PATENT DOCUMENTS 4,659,104 A * 4/1987 Tanaka ................ B60G 17/0185  
280/5.515  
4,805,923 A * 2/1989 Soltis ................. B60G 17/0185  
180/41

(Continued)

FOREIGN PATENT DOCUMENTS

CN 108068570 A 5/2018  
DE 102 45 815 A1 4/2004

(Continued)

OTHER PUBLICATIONS

International Search Report of the European Patent Office dated Jan. 12, 2021 for international application PCT/EP2020/077912 on which this application is based.

(Continued)

*Primary Examiner* — Frank B Vanaman  
(74) *Attorney, Agent, or Firm* — Walter Ottesen, P.A.

(57) ABSTRACT

A module is provided for an air suspension system of a vehicle, the module having a sensor interface for connecting to a sensor, in particular a displacement sensor, a valve, in particular an electropneumatic valve, and a data interface. This sensor interface is configured to receive sensor values from the sensor. The data interface is configured to output sensor values received via the sensor interface to a control device, and to receive control commands for controlling the valve from the control device. Furthermore, the disclosure relates to a control device, an air suspension system, a vehicle, a vehicle trailer, a method for operating an air suspension system, and a computer program product.

21 Claims, 3 Drawing Sheets

(56) References Cited

U.S. PATENT DOCUMENTS

| | | | | |
|---|---|---|---|---|
| 4,993,729 A | * | 2/1991 | Payne | B60G 17/0523 |
| | | | | 280/405.1 |
| 5,052,713 A | * | 10/1991 | Corey | B62D 61/125 |
| | | | | 280/683 |
| 5,587,907 A | * | 12/1996 | Shibata | B60G 17/0182 |
| | | | | 280/6.16 |
| 2008/0054537 A1 | * | 3/2008 | Harrison | B60G 17/016 |
| | | | | 280/124.16 |
| 2014/0333038 A1 | * | 11/2014 | Gocz | B60G 17/052 |
| | | | | 280/124.16 |
| 2017/0225729 A1 | * | 8/2017 | Yakimishyn | B62D 61/125 |
| 2021/0245567 A1 | | 8/2021 | Zak et al. | |

FOREIGN PATENT DOCUMENTS

| | | | | |
|---|---|---|---|---|
| DE | 10 2014 101 084 A1 | 7/2015 | | |
| EP | 0779167 B1 | * | 1/2003 | B60G 17/052 |
| EP | 3 072 716 A1 | 9/2016 | | |
| EP | 3 130 491 A1 | 2/2017 | | |
| JP | H02136318 A | 5/1990 | | |
| WO | 2019/215046 A1 | 11/2019 | | |
| WO | 2020/002151 A1 | 1/2020 | | |

OTHER PUBLICATIONS

Translation of the Written Opinion of the International Searching Authority dated Jan. 12, 2021 for international application PCT/EP2020/077912 on which this application is based.

\* cited by examiner

AIR SUSPENSION SYSTEM FOR A VEHICLE

CROSS REFERENCE TO RELATED APPLICATIONS

This application is a continuation application of international patent application PCT/EP2020/077912, filed Oct. 6, 2020 designating the United States and claiming priority from German application 10 2019 129 014.7, filed Oct. 28, 2019, and the entire content of both applications is incorporated herein by reference.

TECHNICAL FIELD

The disclosure relates to an air suspension system for vehicles, in particular utility vehicles or passenger cars. In particular, the disclosure relates here to a module or a plurality of modules, and to a control device for the air suspension system, to an air suspension system, to a vehicle with an air suspension system of this type, to a vehicle trailer, and to a method for operating the air suspension system.

BACKGROUND

Vehicles which have air suspension systems are known from the prior art. Although air suspension systems are more complicated than the likewise known spring systems which are realized with combinations of a coil or leaf spring with a shock absorber, they increase the driving comfort and the safety. In the case of air suspension systems, the coil or leaf springs are replaced by air springs which include bellows which are filled or can be filled with gas such as, for example, air, in order thus to provide the suspension action. Air suspension systems thus generally make it possible to protect occupants, body and a load of a vehicle against shocks which are caused, for example, by way of ground unevenness while driving.

Furthermore, air suspension systems can be divided fundamentally into two different systems, namely those, in the case of which the gas pressure or the gas mass of the air spring, namely in the bellows, can be adjusted, and those, in the case of which the gas mass cannot be adjusted. The gas mass of the air springs in the case of non-adjustable air suspension systems is accordingly fixedly specified. Here, non-adjustable air suspension systems are comparable functionally with conventional spring systems, in the case of which a combination of a leaf or spiral spring with a shock absorber is used. These air suspension systems which are not adjustable are therefore not the subject matter of the disclosure and thus will not be considered in the further text.

In contrast, adjustable air suspension systems have variable gas pressures or variable gas masses, preferably air masses, of the air springs, namely of the bellows. Accordingly, additional functions are made possible by way of air suspension systems which are adjustable, which additional functions include, for example, a ride height regulation, in the case of which a ground clearance of the vehicle can be adapted by way of adaptation of the gas masses. An adaptation of the gas masses takes place, for example, in a manner which is dependent on a terrain which is to be driven over or a vehicle load, that is, an overall vehicle mass.

Since the behavior of air springs of air suspension systems has a direct influence on the driving behavior of a vehicle with the air suspension system, adjustable air suspension systems are governed by complex regulating mechanisms, in order to make the best possible comfort and the best possible safety possible. Here, for example, constant monitoring takes place of the spacing between the vehicle frame, the body or body parts, such as a wheel arch, and a wheel suspension system. The gas pressures of the individual air springs are also monitored. A multiplicity of valves for wheel-specific filling or emptying of the air springs then has to be actuated in a manner which is dependent on the monitoring.

Therefore, air suspension systems which are adapted precisely to a vehicle, in which they are to be used, are known from the prior art. In the case of these air suspension systems, all the valves which are to be provided for the air springs and a control device for controlling the valves are frequently arranged within one housing. Compressed air hoses of the air springs of the individual wheels are then connected to the housing, and the housing is connected to a compressed air source, in order to realize the air suspension system in a vehicle.

Integrated air suspension systems of this type afford the advantage in comparison with individual equipping of each single wheel with a valve that an air suspension system can be integrated into a vehicle substantially more rapidly. It is disadvantageous here, however, that a system of this type is adapted specifically to a vehicle type. For example, vehicles which have a different number of axles cannot be equipped with the same integrated air suspension system, since the number of valves changes depending on the wheels to be suspended. A system which was configured, for example, for two axles would not have sufficient valves, in order to actuate the air springs of a vehicle with three axles individually. Secondly, a system which was configured for three axles, would be over dimensioned for a vehicle with two axles, since some valves would remain unused and the use of a system of this type would therefore be uneconomical.

SUMMARY

It is an object of the disclosure to provide an adjustable air suspension system which addresses at least one of the problems of the prior art. In particular, an air suspension system is to be found which firstly can be integrated into a vehicle in a simple way, but secondly can be adapted to different vehicles or vehicle types. At any rate, an air suspension system which is alternative to the prior art is to be found.

To this end, the disclosure relates to a module for an air suspension system. The module for the air suspension system is a module for an air suspension system of a vehicle which is, in particular, a utility vehicle or a passenger car. The module has a sensor interface for connecting to a sensor. The sensor interface is configured to receive sensor values from the sensor. Here, in particular, the sensor interface is configured to be connected to a displacement sensor, in order to receive displacement sensor values of the displacement sensor as sensor values. Furthermore, the module has a valve, the valve being, in particular, an electropneumatic valve. Moreover, the module has a data interface which is preferably a bus interface, in particular a CAN bus interface. The data interface is configured to output sensor values received by way of the sensor interface to a control device, and to receive control commands for controlling the valve from the control device.

The module thus consolidates, in particular in one housing, one or more valves, one or more connection options for one or more sensors, and provides a data interface which outputs the sensor values and at the same time accepts control values for the valve. A module of this type can then be used in interaction with a corresponding control device, in order to form the air suspension system overall. A control device can be realized, for example, by any desired control unit and a computing unit, by way of which a regulating method can be carried out. Thus, for example, a control unit which is already present in the vehicle, such as, for example, a brake control unit, an engine control unit, a transmission control unit or the like, can be used as control device, and any desired number of modules can be connected to the control device in a vehicle-specific manner.

For example, the module can be configured for one wheel or one axle, with the result that, in the case of a vehicle with two axles, four modules can be used if the module is configured for one wheel, or two modules can be used if the module is configured for one axle. In the case of a vehicle with three axles, six modules can then be used if the module is configured for one wheel, or three modules can be used if the module is configured for one axle. Accordingly, the modules are connected to the control device, the air springs and a sensor as part of an air suspension system depending on arrangement, for example on the vehicle frame. In this way, the modules can in each case be arranged close to a wheel or an axle, since each module is used exclusively for the actuation of the air springs of an axle which is assigned to it or the air spring of a wheel which is assigned to it. Pressure hoses for connecting the air springs therefore have to be laid only over a short distance. The connecting complexity is therefore likewise reduced.

Moreover, a rapid installation of the air suspension system which is formed by way of modules is thus possible, a vehicle-specific adaptation of the air suspension system also being possible without great complexity. Merely the control device has to be preprogrammed, for example, for different vehicles or vehicle types with different regulating algorithms in a manner which is dependent on the number of modules used. An adaptation of the modules per se is not necessary.

In accordance with a first embodiment, the module additionally includes a pressure sensor for detecting at least one pressure sensor value of a compressed air line which is connected to the valve. Furthermore, the module is configured to output the pressure sensor value via the data interface to the control device.

In this way, a pressure sensor is therefore also already provided for monitoring the air spring pressure, which pressure sensor can be connected to the valve, and the connection to an external pressure sensor, for example in the air spring or in the region of the air spring, can be dispensed with. Additional cabling complexity or the additional arrangement of a pressure sensor is therefore dispensed with, with the result that an even more rapid installation of an air suspension system on a vehicle is possible.

In accordance with a further embodiment, the module includes precisely three valves. An input of the first valve of the three valves can be connected to a pressure source, in particular a compressed air source, and an output of the first valve is connected to the inputs of the second valve and the third valve. Outputs of the second valve and the third valve can be connected in each case to an air spring of an air suspension system.

In accordance with this embodiment, in particular, the module also includes a sensor interface which is configured to be connected to two sensors which are preferably displacement sensors. A sensor interface is used, furthermore, in the singular here, even if it serves to connect more than one sensor, it also being possible for a sensor interface to have two or more plug-in connectors which are connected in each case to a sensor. Accordingly, one or more plug-in connectors for connecting to in each case one sensor are named and combined overall as a sensor interface.

As a result of the arrangement of the three valves, the module is prepared in such a way that it can be assigned to precisely one axle with two wheels, the wheels being assigned in each case one air spring, with the result that the module can correspondingly be assigned to the air springs which are assigned in each case to the wheels. The assignment of one module to precisely one axle is advantageous, since merely the number of axles is dependent on the configuration of the vehicle. In contrast, the number of air springs per axle is identical regardless of an embodiment of the vehicle. As a result of the abovementioned embodiment, the module is therefore configured in such a way that firstly the installation complexity is reduced to one module per axle, since the two air springs of an axle can be actuated at the same time by way of one module, and that secondly an economic adaptation to different vehicle types with a different number of axles is possible.

In accordance with a further embodiment, the module includes two pressure sensors which are arranged in each case in the region of the outputs of the second valve and the third valve. The second valve therefore has a further pressure sensor in the region of its output, and the third valve has a pressure sensor in the region of its output. Here, the region of the output is not restricted to the direct output of the respective valve itself, but rather also includes the flowing region of a pressure hose which is connected to the output of the second or third valve, or of a pressure line which is connected to the output of the second or third valve, through which a fluid, in particular air, flows. In particular, the sensor is also arranged in the region of the output of the corresponding valve in such a way that the pressure of an air spring which is connected via a pressure hose or a pressure line to the valve can be measured, even if the respective valve is closed. In accordance with this embodiment, furthermore, the module is configured to output the pressure sensor values of the pressure sensors via the data interface.

In this way, a continuous measurement of the air pressure of the air springs is possible, even if the valves for feeding in or discharging fluid, in particular air, to and from the valve are closed.

In accordance with a further embodiment, the first valve is a 3/2-way valve. The second valve and the third valve are in each case a 2/2-way valve. As a result of this configuration of the valves, it is possible for a pressure for the air springs, which can be connected to the second and the third valve, to be provided in a first valve position via the first valve, namely in particular the input of the first valve which can be connected to the pressure source, in particular a compressed air source. In the case of a second valve position, in contrast, a gas pressure can be discharged from the air springs via the first valve. Furthermore, as a result of the configuration of the second valve and third valve in each case as a 2/2-way valve, the air springs of the wheels of one axle can be actuated individually. A realization of the valves for providing the full functionality is therefore possible with low complexity of the configuration of the valves.

In accordance with a further embodiment, the first valve has a first passage cross section, the second valve has a second passage cross section, and the third valve has a third passage cross section. The second and the third passage cross section are preferably substantially identical. Substantially identical means that the second passage cross section is identical to the third passage cross section, or the second passage cross section differs from the third passage cross section by less than 10%, less than 5% or less than 1%. In accordance with this embodiment, the first passage cross section corresponds at least to the sum of the second and third passage cross section.

The valves can thus particularly preferably firstly be configured in such a way that the second and third valve are minimized in terms of their overall size in comparison with the first valve, and secondly at the same time pressurizing as rapidly as possible of the air springs or venting of the air springs is possible.

In accordance with a further embodiment, the module is configured to actuate the first valve in a manner which is dependent on the control command in such a way that the throughflow quantity can be controlled in a variable manner, in particular in multiple steps or in an infinitely variable manner. The throughflow quantity through the first valve can therefore be set in a manner which is dependent on the actuation.

In order, in particular, to vent the air springs at a standstill or at night, the air can thus be brought about with a comparatively low throughflow quantity through the first valve, in order thus to reduce the development of noise during venting. During venting while moving, in the case of which a development of noise is not important, for example, the throughflow quantity can be comparatively high, in order to make a rapid variation of the air spring pressure possible. Secondly, for example, the throughflow quantity can also particularly preferably be varied in a manner which is dependent on a speed of the vehicle, in order, for example, to make a higher throughflow quantity at a lower speed possible and to make a lower throughflow quantity at a higher speed possible. The driving comfort can thus be increased, by low change rates for the height adjustment, for example, at high speeds leading to oscillations being reduced or avoided.

In accordance with a further embodiment, the module has a PWM signal generator. A PWM signal generator is a generator which generates a pulse width modulated signal (PWM signal). The PWM signal generator serves to actuate at least the first valve by way of the PWM signal. The throughflow quantity of the valve is thus controlled in a manner which is dependent on the pulse width of the PWM signal, it being possible for the throughflow quantity to be varied from a minimum value, in the case of which the first valve is constantly closed, as far as a maximum value, in the case of which the first valve is constantly open.

An actuation of the first valve which is configured to vary the throughflow quantity in multiple steps or in an infinitely variable manner is particularly simply possible by way of a PWM signal, since a valve of this type which is configured as an electropneumatic valve and can fundamentally switch only between a completely open and a completely closed state can be used for the variation, in particular for the infinitely variable variation, of the throughflow quantity. Therefore, a specifically adapted valve which, for example, has more than two switching states for the variation of the throughflow quantity can be dispensed with.

In accordance with a further embodiment, the module has a fault diagnosis device, in order to carry out a fault diagnosis of the module. The fault diagnosis preferably includes detecting of a fault of the data connection to a control device and/or detecting of a fault of a data connection to the sensor or sensors connected via the sensor interface. As an alternative or in addition, the fault diagnosis includes testing of a valve functionality and/or a function of connected sensors. In the case of a fault which is diagnosed by way of the fault diagnosis, the valve or all the valves of the module is/are moved into a predefined state. It is also possible that the valve or all the valves of the module remains/remain in the position it/they had before the detected fault. In particular, in the case of a detected fault, all the valves of the module therefore remain in the position which the respective valve had before the detected fault. Furthermore, it is possible that, in the case of a detected fault, the valve of the module is closed or all the valves of the module are closed.

An operational readiness of the module can therefore be indicated after conclusion of a fault diagnosis, in the case of which no fault has been detected, it preferably being possible for this result to be transmitted via the data interface to a control device. In the case that a fault is detected by way of the fault diagnosis, a defined state of the valves can at least be assumed. This can also be the last state of the valves before the fault.

Furthermore, the disclosure relates to a control device for receiving pressure sensor values of pressure sensors via a bus from a module for an air suspension system in accordance with one of the abovementioned embodiments. In particular, the control device is also configured to receive sensor values, in particular displacement sensor values of a displacement sensor, via the bus from the module for an air suspension system in accordance with one of the abovementioned embodiments. The bus is preferably a CAN bus. Furthermore, the control device serves to generate and output control commands for a valve of a module in accordance with one of the abovementioned embodiments.

Moreover, the disclosure relates to an air suspension system with one or more modules in accordance with one of the abovementioned embodiments, and preferably with a control device in accordance with one of the abovementioned embodiments. Furthermore, the air suspension system includes a displacement sensor which is connected via the sensor interfaces to the module or one of the modules, and an air spring which is connected to a valve of the module. The module is connected via a data interface and a bus, in particular a CAN bus, to the control device.

In addition, the disclosure relates to a vehicle with the air suspension system in accordance with one of the abovementioned embodiments, the control device being a control unit of the vehicle, in particular a brake control unit of the vehicle. In particular, the vehicle has one of the modules per axle. The vehicle can have two displacement sensors and two air springs per axle, which are connected in each case to the module which is assigned to the axle.

Furthermore, the disclosure relates to a vehicle trailer which has an air suspension system in accordance with one of the abovementioned embodiments. The vehicle trailer has a plurality of axles, each axle preferably being assigned one module, and the vehicle trailer having a control unit. Here, the control unit implements the control device in accordance with the abovementioned embodiments. The control unit is preferably a trailer brake control unit. As an alternative to the configuration of the control device by way of the control unit, the vehicle trailer has an interface, in order to be connected to a towing vehicle which has a control unit which is configured as a control device in accordance with one of the abovementioned embodiments.

Furthermore, the disclosure relates to a method for operating an air suspension system in accordance with one of the abovementioned embodiments. In accordance with the method, displacement sensor values from a displacement sensor which is connected via a sensor interface to a module are first of all received by the module via a control device. Furthermore, pressure sensor values from a pressure sensor of the module are received by way of the control device.

Control commands for a valve of the module are then generated and output to the module by way of the control device.

In addition, the disclosure relates to a computer program product which includes instructions which, when they are run on a control unit of a vehicle or a trailer vehicle, configure the control unit as control device and cause the control unit to carry out the steps of the method according to the disclosure.

BRIEF DESCRIPTION OF THE DRAWINGS

The invention will now be described with reference to the drawings wherein.

DESCRIPTION OF THE PREFERRED EMBODIMENTS

Figure 1:
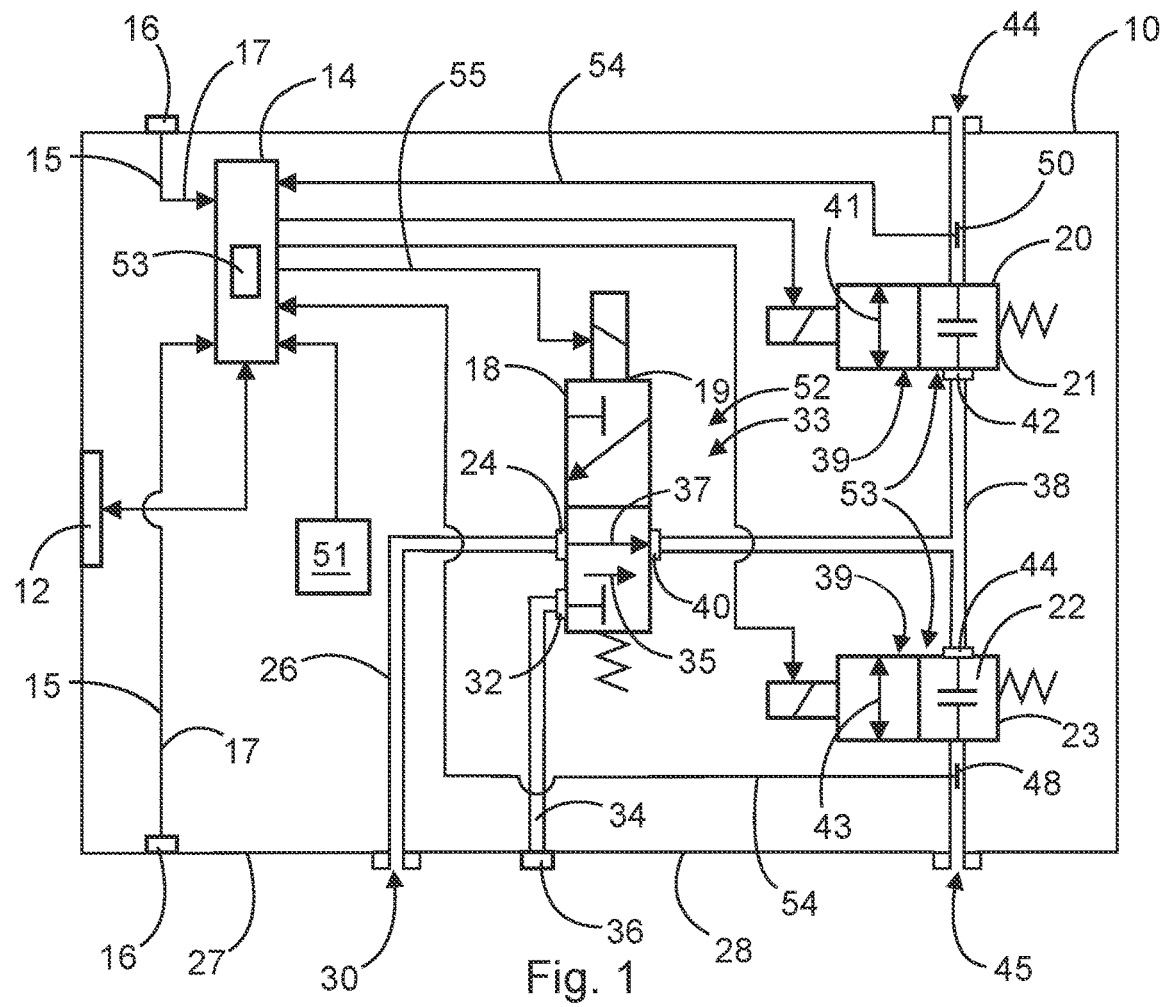
FIG. 1 shows a diagrammatic illustration of a module for an air suspension system.

FIG. 1 shows a diagrammatic illustration of a module 10 for an air suspension system in accordance with one embodiment. The module 10 includes a data interface 12 which can be connected to a bus, in particular a CAN bus. The data interface 12 is connected to a processing unit 14 which is likewise connected to further components of the module 10.

In accordance with this embodiment, the processing unit 14 is connected to two sensor interfaces 16, to which displacement sensors can be connected. A displacement sensor which is connected via the sensor interface 16 supplies, in particular, sensor values 17 which preferably correspond to displacement sensor values 15 and which include a spacing, for example between a wheel suspension system and a chassis of a vehicle. The sensor interfaces 16 thus serve to receive sensor values by way of the processing unit 14, it then being possible for the processing unit 14 to transmit these sensor values in a bus protocol, in order to output these sensor values as a data packet or the like via the interface 12.

Furthermore, the processing unit is connected to three valves 18, 20, 22. The processing unit 14 serves to actuate the valves 18, 20, 22 when a data packet which requests an actuation of one or more valves 18, 20, 22 is received via the data interface 12. The three valves 18, 20, 22 are configured as electropneumatic valves 19, 21, 23.

One of the valves 18, 20, 22 which is called first valve 18 in the further text is configured as a 3/2-way valve. Here, the first valve 18 has an input 24, to which a pressure source, in particular a compressed air source, can be connected. To this end, the input 24 is guided via a compressed air line 26 to an outer side 27 of the housing 28 of the module 10, and forms a compressed air connector 30 here. Furthermore, an output 32 is provided on the first valve 18, which output 32 is likewise guided via a compressed air line 34 to the outer side 27 of the housing 28. A silencer 36 is arranged at the end of the compressed air line 34 on the outer side 27 of the housing 28.

In the position which is shown, that is, the state or switching state which is shown, of the first valve 18, air can thus be guided with a throughflow quantity 35 via a pressure source which is connected to the compressed air connector 30, through the first valve 18 to the valves 20, 22. To this end, the first valve 18 has a passage cross section 37 in the position which is shown, namely the passage position 33.

The valves 20, 22 are closed in the position which is shown, namely the closed position 39. The valve 20 is called second valve 20 in the further text, and the valve 22 is called third valve 22 in the further text. If the valves 20, 22 are switched over by actuation by way of the processing unit 14, the compressed air which is provided via the first valve 18 can flow through a compressed air line 38, which is guided from an output 40 of the first valve 18 to inputs 42, 44 of the second valve 20 and the third valve 22, through the second valve 20 and the third valve 22, and can flow out at outputs 45, 46 of the module 10. To this end, the second valve 20 has a second passage cross section 41, and the third valve 22 has a third passage cross section 43. An air spring of an air suspension system can be connected in each case at the outputs 45, 46.

Furthermore, in a passage position of the second valve 20 and the third valve 22 which is not shown in each case here, compressed air can also be discharged from the air springs through the first valve and through the compressed air line 34 by way of switching over of the first valve 18 into a discharge position (not shown) of the first valve 18. To this end, the silencer 36 is provided, in order to reduce the development of noise during venting of the air springs. In the closed position 39 which is shown of the second valve 20 and the third valve 22, an air pressure in the air springs which can be connected to the outputs 45, 46 can be measured via pressure sensors 48, 50 which are integrated into the module 10.

A pressure sensor value 54 which is detected by way of these pressure sensors 48, 50 can be converted into a data protocol of a bus system by the processing unit 14, just like the abovementioned displacement sensor values 15, in order to output the pressure sensor values 54 via the data interface 12.

Furthermore, the module 10 includes a fault diagnosis device 51. If a fault of the module 10 is determined by way of the fault diagnosis device 51, the valves 18, 20, 22 are switched into a predefined position 52, 53. The predefined position 52, 53 preferably corresponds to the open state which is shown, that is, the passage position 33, of the first valve 18 and the closed state which is shown, that is, the closed position 39, of the second valve 20 and the third valve 22.

Furthermore, the processing unit 14 includes a generator 53 for generating a pulse width modulated signal 55, by way of which the first valve 18 is actuated. The throughflow quantity 35 of an air flow through the first valve 18 can thus be varied. In particular in the case of discharging of air, a development of noise can thus be reduced further by way of a small throughflow quantity 35. In accordance with a further embodiment which is not shown here, the silencer 36 can thus also be dispensed with.

Figure 2:
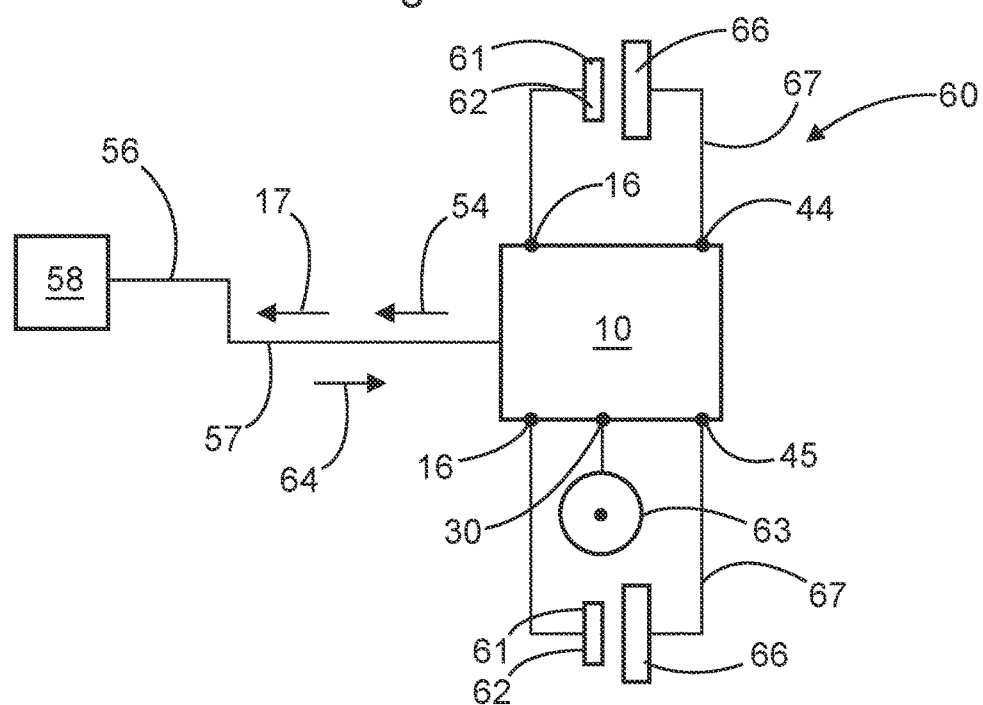
FIG. 2 shows a diagrammatic illustration of an air suspension system.

FIG. 2 shows a diagrammatic illustration of an air suspension system 60 with the module 10 which is shown in FIG. 1. Two sensors 61 which are displacement sensors 62 are connected via the sensor interfaces 16 to the module 10. Furthermore, a compressed air source 63 is connected to the compressed air connector 30 of the module 10. The outputs 45, 46 are connected in each case via a compressed air line 67 to an air spring 66. Sensor values 17 which are received from the displacement sensors 62 by way of the sensor interface 16 can thus be transmitted via a bus 56 to the control device 58. To this end, the data interface 12 is connected to the bus 56 which is a CAN bus 57. Furthermore, pressure sensor values 54 which are recorded by way of the pressure sensors 48, 50 which are not shown here are also transmitted to the control device 58. The control device 58 transmits control commands 64 via the bus 56 to the module 10, by way of which control commands the valves 18, 20, 22 are actuated.

Figure 3:
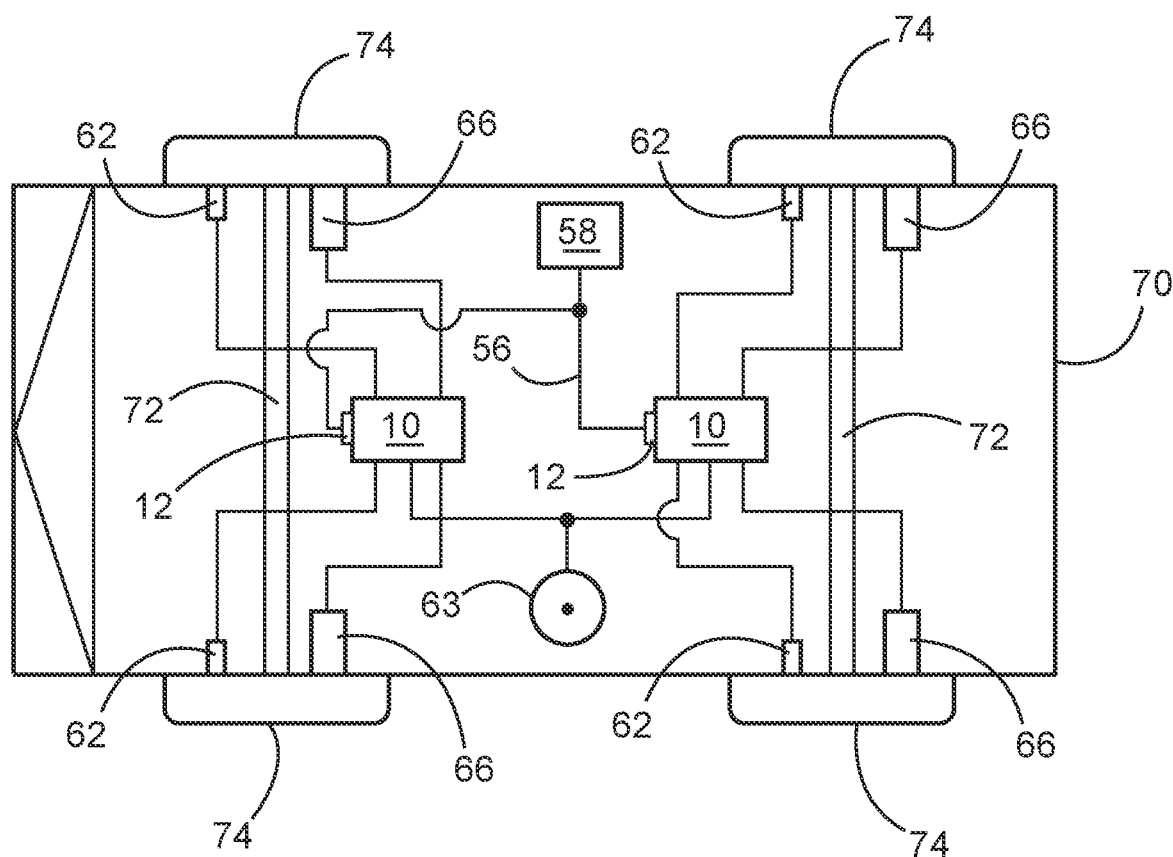
FIG. 3 shows a diagrammatic illustration of a vehicle with an air suspension system.

FIG. 3 shows a diagrammatic illustration of a vehicle 70 with a control device 58 and two modules 10. Each of the modules 10 is assigned to one of the axles 72 of the vehicle. The two modules 10 have the data interface 12 and are connected by way of it via a bus 56 to the control device 58. Furthermore, the modules 10 are connected in each case to two air springs 66 and two displacement sensors 62. Each of the displacement sensors 62 and each of the air springs 66 are assigned to a wheel 74 of the vehicle 70.

Figure 4:
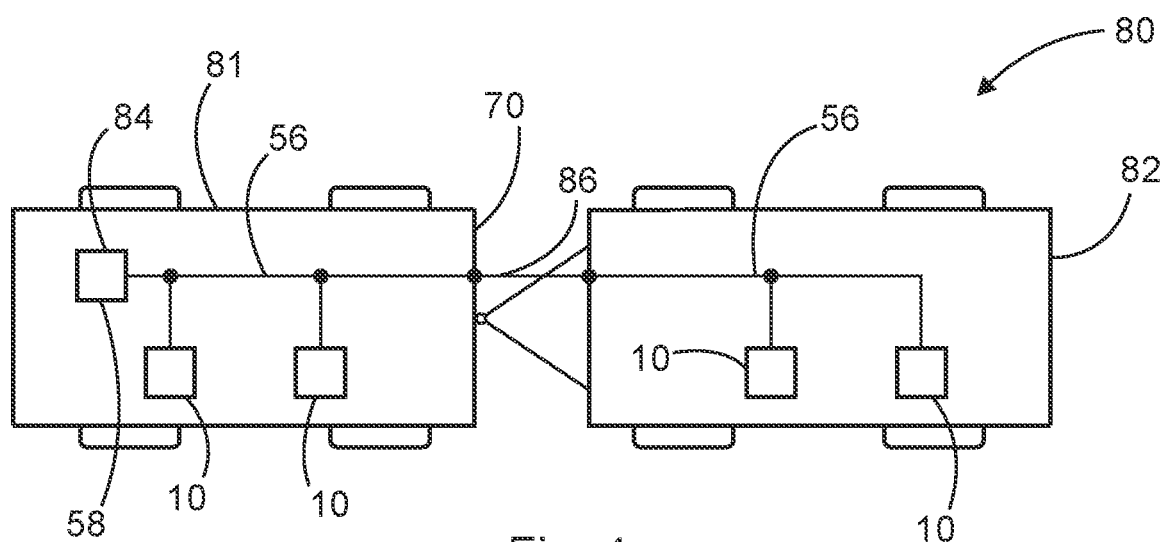
FIG. 4 shows a diagrammatic illustration of a towing vehicle/trailer combination with an air suspension system.

FIG. 4 shows a diagrammatic illustration of a towing vehicle/trailer combination 80 which has a vehicle 70, for example the vehicle 70 from FIG. 3. Here, the vehicle 70 corresponds to a towing vehicle 81, to which a vehicle trailer 82 is coupled. The vehicle 70 has a brake control unit 84 which serves here as control device 58. The control device 58 is connected to four modules 10, each of the modules 10 being assigned to one of the axles 72 of the vehicle 70 and of the vehicle trailer 82. The bus 56 for connecting the control device 58 to the modules 10 is guided to this end further via a cable connection 86 between the vehicle 70 and the vehicle trailer 82 to the vehicle trailer 82. In accordance with an embodiment of the disclosure which is not shown here, a radio connection is provided instead of the cable connection 86.

Figure 5:
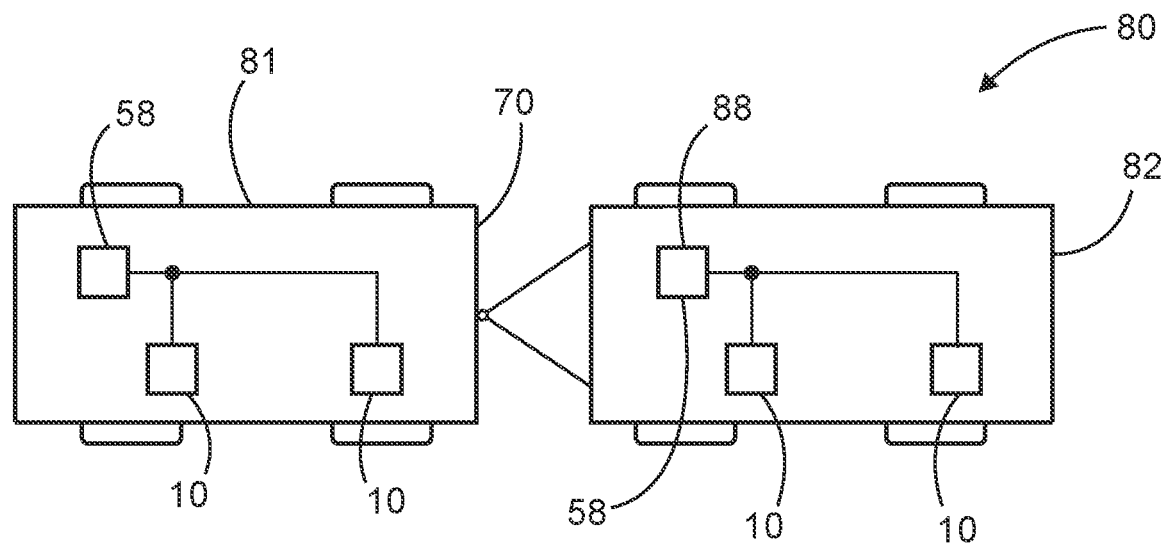
FIG. 5 shows a diagrammatic illustration of a further towing vehicle/trailer combination with an air suspension system; and, FIG. 6 shows a flow chart of steps of a method for operating an air suspension system.

FIG. 5 shows an alternative embodiment to the embodiment of FIG. 4. FIG. 5 once again shows a diagrammatic illustration of a vehicle 70 which is configured as a towing vehicle 81, and a diagrammatic illustration of a vehicle trailer 82, which can together be called a towing vehicle/trailer combination 80. Here, however, in addition to the control device 58 of the towing vehicle 81, a further control device 58 is provided in the vehicle trailer 82, which further control device 58 controls the modules 10 of the vehicle trailer 82 and receives sensor values 17 and pressure sensor values 54 from them. The control device 58 in the vehicle trailer 82 is a trailer brake control unit 88 in accordance with this embodiment.

Figure 6:
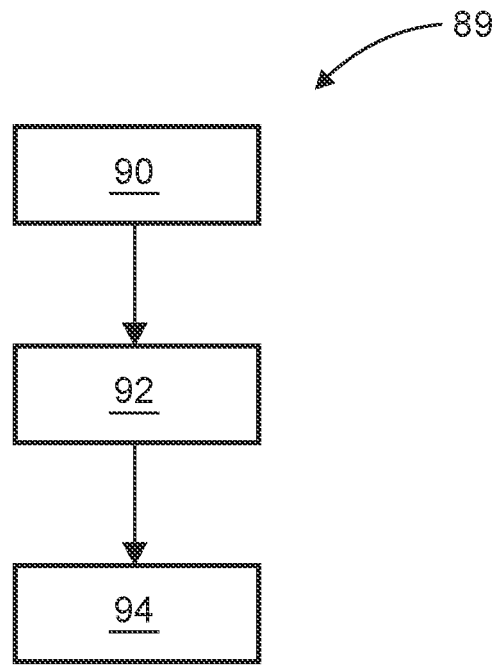

FIG. 6 shows a flow chart of the steps of one embodiment of a method 89 for operating an air suspension system. In a step 90, sensor values 17 from at least one displacement sensor 62 and pressure sensor values 54 from a pressure sensor 48, 50 are received by a module 10 by way of a control device 58. In step 92, control commands for a valve 18, 20, 22 are generated in the control device 58. In step 94, the control commands are then output to the module 10.

It is understood that the foregoing description is that of the preferred embodiments of the invention and that various changes and modifications may be made thereto without departing from the spirit and scope of the invention as defined in the appended claims.

LIST OF DESIGNATIONS (CONSTITUENT PART OF THE DESCRIPTION)

10 Module
12 Data interface
14 Processing unit
15 Displacement sensor values
16 Sensor interfaces
17 Sensor values
18 Valve
19 Electropneumatic valve
20 Valve
21 Electropneumatic valve
22 Valve
23 Electropneumatic valve
24 Input
26 Compressed air line
27 Outer side
28 Housing
30 Compressed air connector
32 Output
33 Passage position
34 Compressed air line
35 Throughflow quantity
36 Silencer
37 First passage cross section
38 Compressed air line
39 Closed position
40 Output
41 Second passage cross section
42 Input
43 Third passage cross section
44 Input
45 Output
46 Output
48 Pressure sensor
50 Pressure sensor
51 Fault diagnosis device
52 Predefined position
53 Predefined position
54 Pressure sensor value
55 Pulse width modulated signal
56 Bus
57 CAN bus
58 Control device
60 Air suspension system
61 Sensor
62 Displacement sensor
63 Compressed air source
64 Control commands
66 Air springs
67 Compressed air line
70 Vehicle
72 Axles
74 Wheel
80 Towing vehicle/trailer combination
81 Towing vehicle
82 Vehicle trailer
84 Brake control unit
86 Cable connection
88 Trailer brake control unit
89 Method
90 Step
92 Step
94 Step

What is claimed is:

1. An exchangeable module for an air suspension system of a vehicle, the exchangeable module comprising:
a single housing;
a sensor interface arranged directly on said single housing and configured to be connectable to a sensor and to receive sensor values from the sensor;

a valve arranged in said single housing;

a data interface being arranged directly on said single housing and being configured to output sensor values received via said sensor interface to a control device disposed externally to said exchangeable module and to receive control commands for controlling said valve from the control device;

said data interface and said sensor interface being separate from each other;

wherein the control device is external to any module of the air suspension system;

wherein the module is configured to actuate said valve in a manner dependent upon the control commands, in order to control a throughflow quantity at least through said valve in a variable manner, and the throughflow quantity is controlled in a manner dependent on a speed of the vehicle; and, a PWM signal generator for actuating said valve via a PWM signal; and, said PWM signal generator being configured for a variable control of a throughflow quantity through said valve.

2. The exchangeable module of claim 1 further comprising:

a pressure sensor for detecting pressure sensor values of a compressed air line which is connected to said valve; and, said pressure sensor being configured to output the pressure sensor values via said data interface to the control device.

3. The exchangeable module of claim 1, wherein said valve is a first valve and the module has precisely three valves including said first valve, a second valve, and a third valve; said first valve has a first input and a first output; said second valve has a second input and a second output; said third valve has a third input and a third output; said first input is configured to connect to a pressure source; said first output is configured to connect to said second input and said third input; and, said second output and said third output each are configured to connect to an air spring of the air suspension system.

4. The exchangeable module of claim 3 further comprising:

a first pressure sensor and a second pressure sensor;

said first pressure sensor being arranged in a region of said second output of said second valve;

said second pressure sensor being arranged in a region of said third output of said third valve; and, the exchangeable module being configured to output pressure sensor values of said first pressure sensor and said second pressure sensor to the control device via said data interface.

5. The exchangeable module of claim 3, wherein said first valve is a 3/2-way valve; and, said second valve and said third valve are each a 2/2-way valve.

6. The exchangeable module of claim 3, wherein said first valve defines a first passage cross section, said second valve defines a second passage cross section, and said third valve defines a third passage cross section; and, said first passage cross section corresponds at least to a sum of said second passage cross section and said third passage cross section.

7. The exchangeable module of claim 6, wherein said second passage cross section and said third passage cross section are substantially identical.

8. The exchangeable module of claim 3 further comprising a fault diagnosis device configured to switch said first, second and third valves into a predefined state.

9. The exchangeable module of claim 1 further comprising a fault diagnosis device.

10. The exchangeable module of claim 1, wherein said sensor interface is configured to connect to a displacement sensor.

11. The exchangeable module of claim 1, wherein said valve is an electropneumatic valve.

12. The exchangeable module of claim 1, wherein said data interface is configured to connect to a bus or a CAN bus.

13. A control device configured to receive pressure sensor values of a pressure sensor from at least one exchangeable module as claimed in claim 1, and to generate and output control commands for the valve of the exchangeable module, wherein the control device is configured to receive the pressure sensor values via a bus or CAN bus.

14. A vehicle comprising:

an air suspension system having a control device and an exchangeable module according to claim 1;

a control unit;

said air suspension system further having an air spring connected to said valve;

a displacement sensor connected to said exchangeable module via said sensor interface; and, said exchangeable module being connected to the control device via said data interface and a bus;

a plurality of axles; and, wherein the vehicle has a plurality of said exchangeable modules and each of said plurality of axles has one of said plurality of said exchangeable modules assigned thereto.

15. The exchangeable module of claim 1, wherein the throughflow is controlled such that the throughflow is higher at lower speeds than at higher speeds.

16. An air suspension system comprising:

an exchangeable module having a single housing and a sensor interface arranged on said single housing;

said sensor interface being arranged directly on said single housing and being configured to be connectable to a sensor and to receive sensor values from the sensor;

said exchangeable module further having a valve disposed in said single housing and a data interface arranged on said single housing;

said data interface being arranged directly on said single housing and being configured to output sensor values received via said sensor interface to a control device and to receive control commands for controlling said valve from the control device, wherein the control device is external to said exchangeable module;

an air spring connected to said valve;

a displacement sensor connected to said exchangeable module via said sensor interface; and, said exchangeable module being connected to the control device via said data interface and a bus;

said exchangeable module being configured to actuate said valve in a manner dependent upon the control commands, in order to control a throughflow quantity at least through said valve in a variable manner, and the throughflow quantity being controlled in a manner dependent upon a speed of the vehicle;

a PWM signal generator for actuating said valve via a PWM signal; and, said PWM signal generator being configured for a variable control of a throughflow quantity through said valve.

17. A vehicle trailer comprising:

an air suspension system according to claim 16;

a plurality of axles;
wherein the vehicle trailer includes a plurality of said exchangeable modules;
wherein each of said plurality of axles has one of said exchangeable modules assigned thereto; and,
wherein the vehicle trailer includes the control device as a dedicated control device of the vehicle trailer or said exchangeable module is connected to the control device which is part of a towing vehicle.

18. The air suspension system of claim 16, wherein the control device is external to the air suspension system.

19. A method for operating an air suspension system, wherein the air suspension system includes an exchangeable module having a single housing, a sensor interface being arranged directly on said single housing and configured to be connectable to a sensor and to receive sensor values from the sensor, the exchangeable module further having a valve disposed in said single housing and a data interface arranged directly on said single housing, said data interface being configured to output sensor values received via the sensor interface to a control device and to receive control commands for controlling said valve from the control device, the air suspension system further having an air spring connected to the valve and a displacement sensor connected to the exchangeable module via the sensor interface, the data interface being separate from the sensor interface, the exchangeable module being connected to the control device via the data interface and a bus, the control device being external to said exchangeable module, a PWM signal generator for actuating said valve via a PWM signal; and, said PWM signal generator being configured for a variable control of a throughflow quantity through said valve, the method comprising:
receiving displacement sensor values of the displacement sensor and pressure sensor values of a pressure sensor from the control device;
generating control commands for the valve of the exchangeable module in order to control a throughflow quantity at least through said valve in a variable manner and the throughflow quantity being controlled in a manner dependent upon a speed of the vehicle; and,
outputting the control commands to the exchangeable module.

20. A computer program product comprising program code stored on a non-transitory computer readable medium, wherein said program code is configured, when executed by a processor, to carry out the method of claim 19, wherein the control device includes the processor.

21. A module for an air suspension system of a vehicle, the module comprising:
a housing;
a sensor interface arranged on said housing and configured to connect to a sensor and to receive sensor values from the sensor;
a valve arranged in said housing; and,
a data interface arranged on said housing and configured to output sensor values received via said sensor interface to a control device and to receive control commands for controlling said valve from the control device;
said data interface and said sensor interface being separate from each other;
wherein the control device is external to any module of the air suspension system;
wherein the module is configured to actuate said valve in a manner dependent upon the control commands, in order to control a throughflow quantity at least through said valve in a variable manner, and the throughflow quantity is controlled in a manner dependent on a speed of the vehicle; and,
wherein a first throughflow quantity when the vehicle is at a standstill is lower than a second throughflow quantity when the vehicle is moving.

* * * * *